(No Model.)
F. E. NICHOL.
SUSPENSION OF INCANDESCENT GAS LAMPS.
No. 555,732. Patented Mar. 3, 1896.
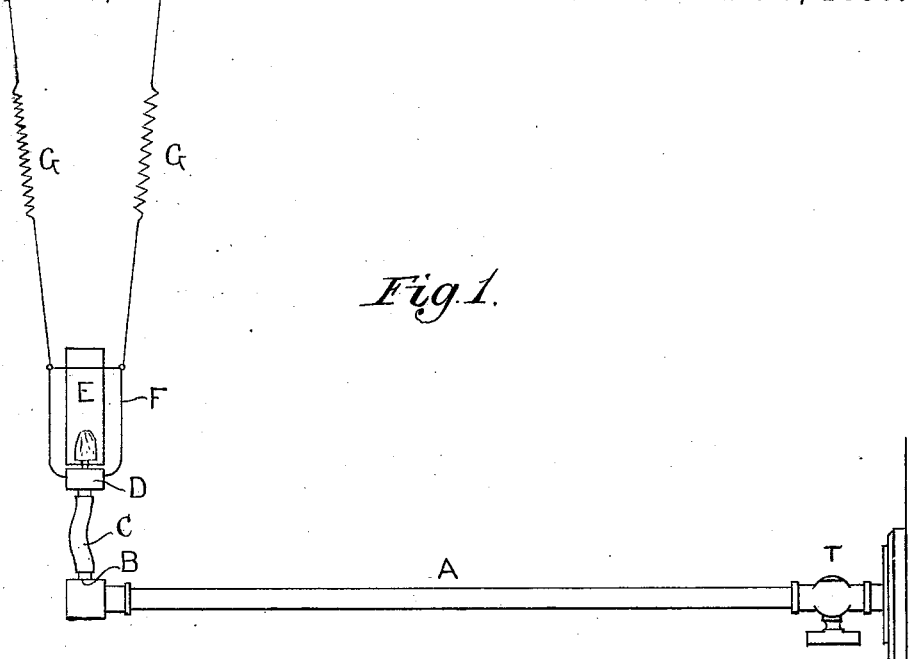
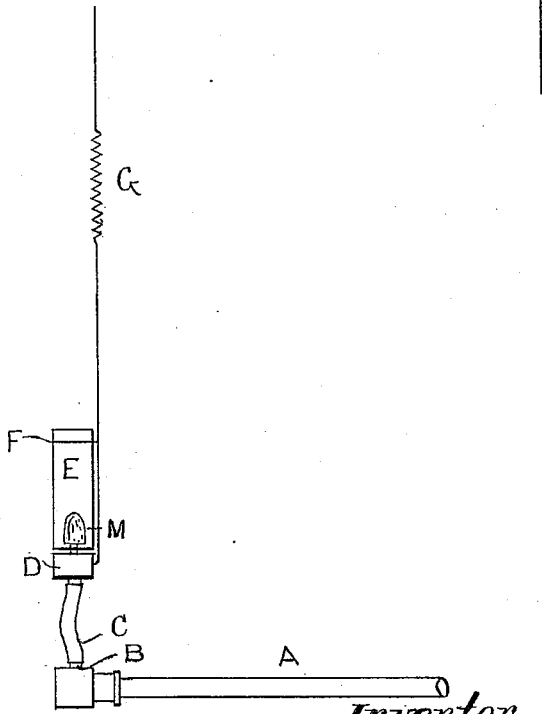
Witnesses. Inventor.
Frank Ernest Nichol.
By James L. Norris.
Atty.

UNITED STATES PATENT OFFICE.

FRANK E. NICHOL, OF PORTO BELLO, SCOTLAND, ASSIGNOR OF ONE-HALF TO THOMAS REDMAN, OF BRADFORD, ENGLAND.

SUSPENSION OF INCANDESCENT GAS-LAMPS.

SPECIFICATION forming part of Letters Patent No. 555,732, dated March 3, 1896.

Application filed September 26, 1895. Serial No. 563,764. (No model.) Patented in England October 13, 1894, No. 19,462.

*To all whom it may concern:*

Be it known that I, FRANK ERNEST NICHOL, a subject of the Queen of Great Britain and Ireland, residing at Porto Bello, in the county of Mid-Lothian, Scotland, have invented certain Improvements in and Relating to the Suspension of Incandescent Gas-Lamps, (for which I have obtained Letters Patent in England, No. 19,462, dated October 13, 1894,) of which the following is a specification.

The object of this invention is to support the fitting to which a gas-burner is coupled by so suspending the fitting that an incandescent gas-mantle may be utilized in mills, factories, and other places where there is vibration, and thus by my new combination to overcome the difficulty hitherto experienced in applying and utilizing the benefits derived in the increase of light by the use of mantles when fixed to gas-fittings secured to the gas-supply in places subject to shocks and vibrations.

The accompanying drawing illustrates how my invention may be applied to a gas-burner attached to a wall or the like, and in describing my invention in detail reference is made to the letters on the drawing.

The gas-bracket A is one of the ordinary description provided with the usual stop-tap T, but without a gas-burner having a metallic connection with the gas-bracket. To the vertical portion of the gas-bracket at B, I attach a piece of flexible tube C, which is also connected to a gas-burner fitting D, arranged to carry a glass chimney E, and an incandescent gas-mantle within same, the mantle being of the ordinary kind and carried in the usual manner. To the before-mentioned gas-fitting is attached a light metallic frame F of suitable form, which is suspended from some fixture in a suitable manner by one or more elastic cords or spiral springs G. When two or more cords or springs G are used they are at an angle somewhat as shown, but when suspended by one the cord or spring G is vertical and may be attached to the metallic frame F close to the chimney E, so that should any shock or vibration be given to the gas-bracket A the shock or vibration is not conveyed to the gas-burner fitting D and mantle M supported thereby, but absorbed to a great extent by the flexible suspending cord or cords or springs G, in a manner that no shock is transmitted to the mantle M of such an extent as to shake same in a manner that the mantle is damaged. Thus by my new combination and arrangement of parts the difficulty hitherto experienced with the use and maintenance of mantles in places subject to sudden shocks and vibrations is overcome.

I do not wish to be understood as broadly claiming a lamp supported through the medium of a spring or springs, as I am aware that this has heretofore been proposed. My invention differs from prior devices in that an elastic gas-conducting tube rises from a gas-supply bracket and supports at its upper end a gas-burner fitting, on which is mounted a chimney containing a gas-mantle, while the gas-burner fitting is suspended by elastic supports from above.

What I claim as my invention is—

1. The combination with a gas-supply bracket, of an elastic gas-conducting tube connected to and rising from the gas-supply bracket, a gas-burner fitting mounted on the upper end of said elastic tube, a chimney carried by said gas-fitting, a gas-mantle located within the chimney, and an elastic support suspending the gas-burner fitting from above, substantially as described.

2. The combination with a gas-supply bracket, of an elastic gas-conducting tube connected to and rising from one end of the gas-supply bracket, a gas-burner fitting mounted on the upper end of said elastic tube, a chimney carried by said gas-fitting, a gas-mantle located within the chimney, a frame secured to and rising from the gas-fitting, and elastic supports connected with said frame and suspending it and the gas-burner fitting from above, substantially as described.

In testimony whereof I have signed my name to this specification in the presence of two subscribing witnesses.

F. E. NICHOL.

Witnesses:
WM. GLASSOP,
HERBERT L. DEBBS.